United States Patent [19]

Nagata

[11] Patent Number: 4,899,609
[45] Date of Patent: Feb. 13, 1990

[54] GEARS HAVING A TOOTH-PROFILE WITH A SMALLER RELATIVE OF CURVATURE AT A CONTACT POINT

[75] Inventor: Shigeyoshi Nagata, Tokyo, Japan

[73] Assignee: Kyouiku Haguruma Kogko Kabushiki-Kaisha, Tokyo, Japan

[21] Appl. No.: 170,407

[22] PCT Filed: Oct. 31, 1986

[86] PCT No.: PCT/JP86/00555
§ 371 Date: Mar. 18, 1988
§ 102(e) Date: Mar. 18, 1988

[87] PCT Pub. No.: WO88/03239
PCT Pub. Date: May 5, 1988

[51] Int. Cl.$^4$ ............................................. F16H 55/00
[52] U.S. Cl. ..................................................... 74/462
[58] Field of Search ........................................... 74/462

[56] References Cited

U.S. PATENT DOCUMENTS

Re. 29,115  1/1977  Rouverol .............................. 74/462
4,149,431  4/1979  Rouverol .............................. 74/462
4,644,814  2/1987  Rouverol .............................. 74/462

OTHER PUBLICATIONS

Standard Handbook for Mechanical Engineers (9th Edition), 1951, pp. 80-90 to 80-107.

Primary Examiner—Allan D. Herrmann
Attorney, Agent, or Firm—William D. Hall

[57] ABSTRACT

The gears according to the present invention have a unique tooth-profile in which the radius of curvature repeatedly increases and decreases from the pitch line in the direction of addendum and deddendum of a tooth without monotonously changing, and at the point where the relative of curvature is minimum, the center of the radius of curvature is positioned on the pitch line. Specifically, the curvature of the tooth-profile curve is a function which is not monotonously varied, is continuous and is capable of being differentiated, and a locus of the center of curvature forms a series of continuous curves which exist near the pitch circle. Forming the tooth-profile thus enables the relative of curvature to be brought from the value in the involute gear near that of a Wildhaver-Novikov type, with the contact interval being more than one. Also, the operating pressure angle is decreased to prevent the increase in the surface pressure and the bearing stress, and the relative of curvature between the tooth-surfaces of the gears is maintained at a lower level than the conventional one, markedly increasing the strength of the tooth-profile. The present invention can also be applied to internal gears, bevel gear, etc.

8 Claims, 4 Drawing Sheets

GEARS HAVING A TOOTH-PROFILE WITH A SMALLER RELATIVE OF CURVATURE AT A CONTACT POINT

FIELD OF THE INVENTION

The present invention relates generally to gears, and more particularly to gears having a tooth-profile with a smaller relative curvature at a contact point.

DESCRIPTION OF THE PRIOR ART

As a tooth-profile of power transmitting gears, an involute tooth-profile is typically employed, but other tooth-profiles are also utilized, for example a cycloid tooth-profile, a circular arc tooth-profile, or a combination thereof.

In these gear's art tooth-profiles except for the circular arc tooth-profile, a radius of curvature is monotonously and continuously varied. Also, in the circular arc tooth-profiles of gears having a finite number of gear teeth, the radius of curvature thereof is continuously varied. It is impossible, therefore, to retain or maintain the relative curvatures between two adjacent tooth-profiles at a smaller value or a constant value during their engagement.

Further, the strength of the tooth-profile has an upper limit determined by a bending stress therein and another upper limit determined by the tooth surface pressure stress. Generally in an involute gear, however, since the limit determined by the bending stress is higher than the limit determined by the tooth surface pressure stress, it is necessary to increase the limit (named the K value) determined by the tooth surface pressure stress.

In order to increase the K value, however, it is required to decrease the relative curvature between tooth surfaces at the point of engagement thereof, because the Hertz stress is affected by the relative curvature.

As an example of a tooth-profile having a smaller relative curvature, there is a tooth-profile of the Wildhaver-Novikov type, but in order to use this tooth-profile for power transmitting gears, the gears must be a helical gear with a large width, since this tooth-profile is a point contact type (contact interval=0) in which the tooth-profiles engagement with each other only at a single point thereon.

DISCLOSURE OF THE INVENTION

The present invention was made from the above view point. It is an object of the present invention to provide gears wherein the relative of curvature between tooth-surfaces is brought near to that of Wildhaver-Novikov type tooth-profile, its contact interval is more than one, the operating pressure angle is decreased to thereby prevent the surface pressure and the bearing stress from being increased, and the relative curvature between two tooth-surfaces is maintained at a lower level to thereby markedly increase the strength of the tooth-profile.

Specifically, according to the present invention, the radius of curvature of the tooth-profile is repeatedly increased and decreased from a pitch line in the direction of addendum and dedendum of a tooth without monotonously changing as in the prior art. And, preferably at the point where the radius of curvature is minimum, the center of the radius of curvature is positioned on the pitch line. In this case, the relative curvature between tooth-profiles at this point becomes zero, but in the gears according to the present invention, a plurality of the points at which the relative curvature becomes zero periodically appear in one pitch. In these points, of course, the specific sliding is also zero.

The present invention is intended to provide a complete tooth-profile obtained through many trials and errors on various tooth-profiles formerly proposed.

The above object of the present invention is accomplished by providing a tooth-profile wherein the curvature of the tooth-profile curve is a function which is not monotonously varied and is continuous and capable of being differentiated, and a locus of the center of curvature forms a series of continuous curves which exist generally near a pitch circle.

In this case, the center of curvature corresponding to the point of relative of curvature being zero is preferably positioned on a pitch line.

Also, it is preferred that a locus of the centers of curvature is a series of curves which is formed by alternately connecting a small arc having its center within the pitch circle and a small arc having its center outside the pitch circle so that the arcs have a common normal line at each end thereof, and that the tooth-profile curve consists of a curve formed by connecting alternately and smoothly the involutes of said two types of small arcs.

By forming the tooth-profile as described above, it is possible for the relative curvature to be brought from the involute gear value to near the value in a Wildhaver-Novikov type tooth-profile, with the ratio of contact being more than one, and for the operating pressure angle to be decreased to thereby prevent the increase in surface pressure and bearing stress, and for the relative of curvature between tooth-surfaces the gears to be maintained at a lower level than in the prior art, whereby the strength of the tooth-profile is markedly increased.

The present invention can be applied not only to general external gears but also to internal gears, as well as to other gears, such as bevel gears.

PREFERRED EMBODIMENT OF THE INVENTION

Figure 1:
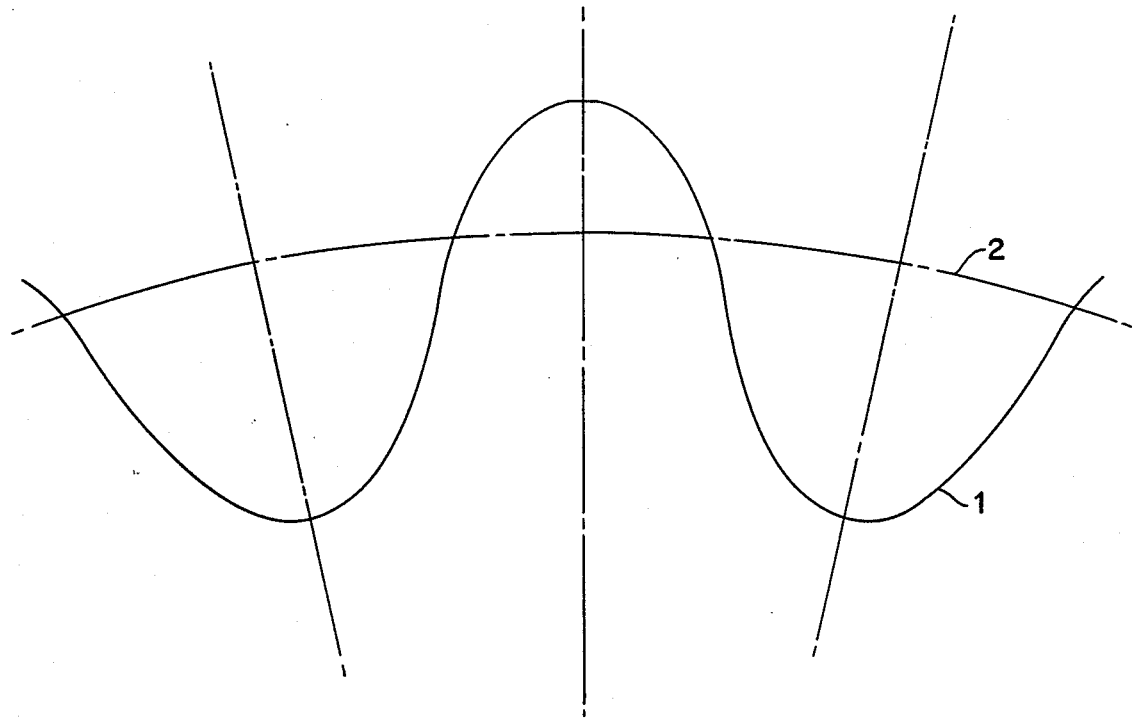
FIG. 1 is an enlarged partial view showing an embodiment of the tooth-profile of the gear according to the present invention, the tooth-profile having a smaller relative curvature at a point of contact thereof.
Figure 2:
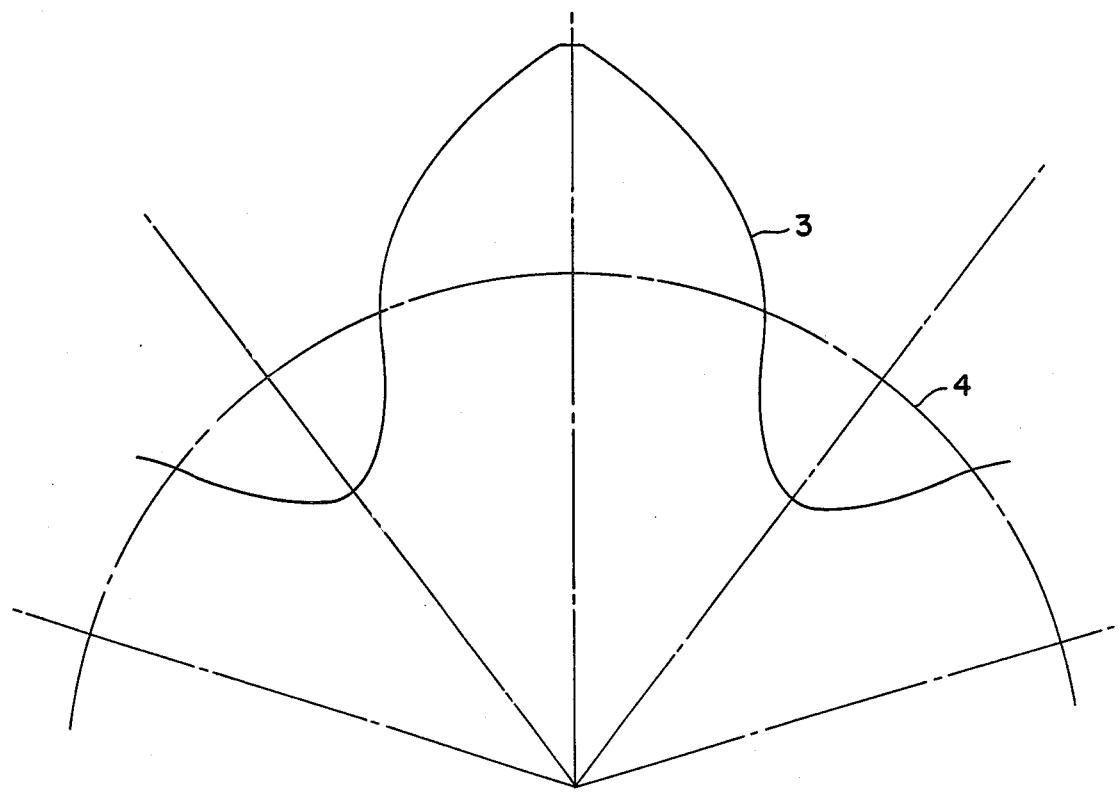
FIG. 2 is an enlarged partial view of an embodiment of the tooth-profile of the opposite gear engaging with the gear shown in FIG. 1.
Figure 3:
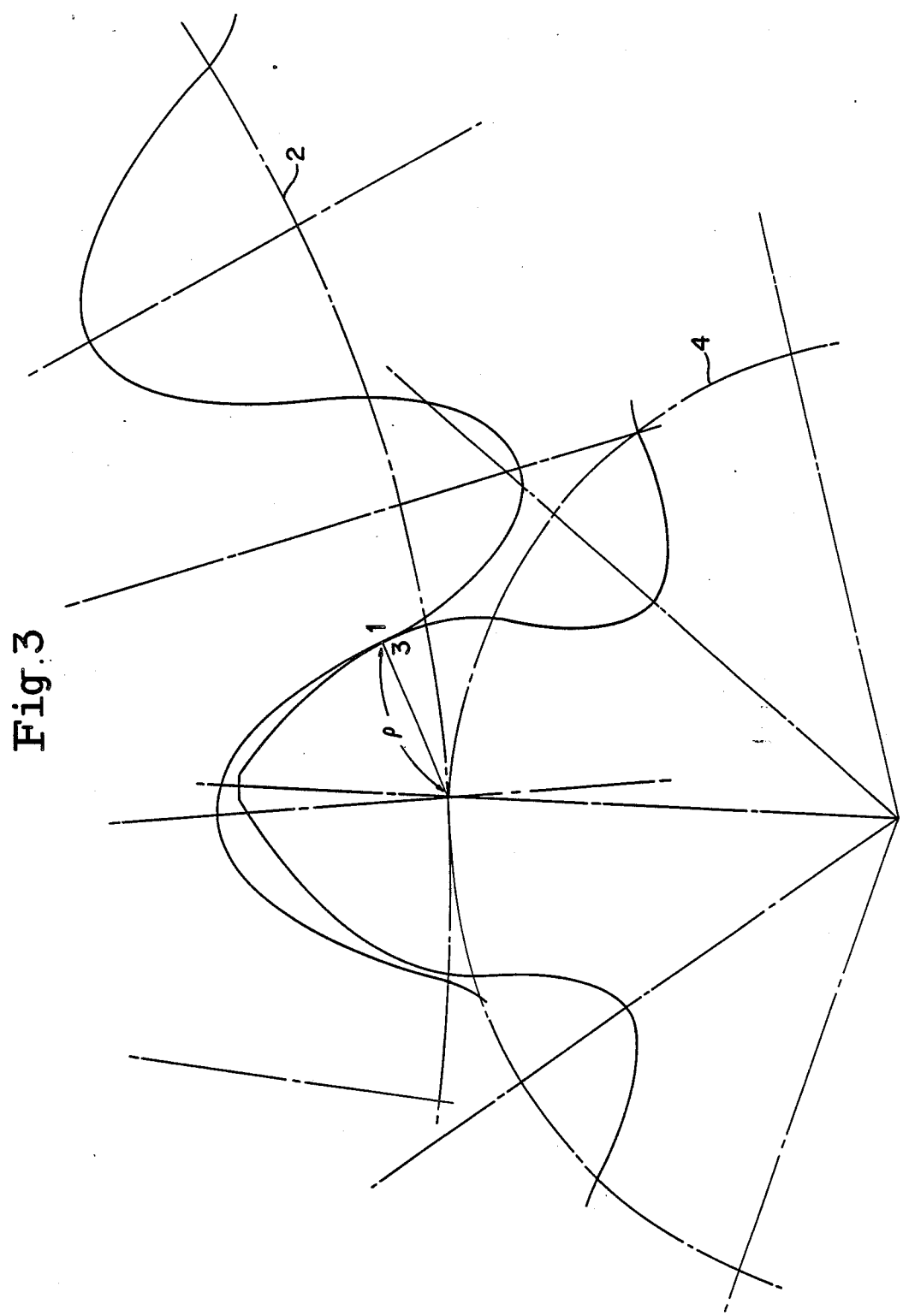
FIG. 3 is a diagram showing a state of engagement of the above two gears.

Referring to FIGS. 1, 2 and 3, reference numeral 1 denotes a tooth-profile curve of a gear with fifteen teeth, 2 denotes the pitch circle thereof, 3 denotes a tooth-profile curve of a gear with five teeth, and 4 denotes the pitch circle thereof.

The tooth-profiles 1 and 3 of the gears according to the present invention are constructed so that their respective radius of curvatures vary, repeatedly increasing and decreasing from respective pitch circles in the direction of addendum and dedendum of the teeth respectively. At the point relative of curvature being zero, the center of the radius of curvature is on the pitch circle. When the gears engage with each other in such a condition, therefore, the relative curvature of the tooth-profiles 1 and 3 becomes zero.

In the gears according to the present invention, plural points at which the relative curvature of the tooth-profiles 1 and 3 becomes zero, appear cyclically in one pitch.

The tooth-profile of a basic rack used to form the above-described tooth-profiles will now be explained with reference to FIG. 4.

Figure 4:
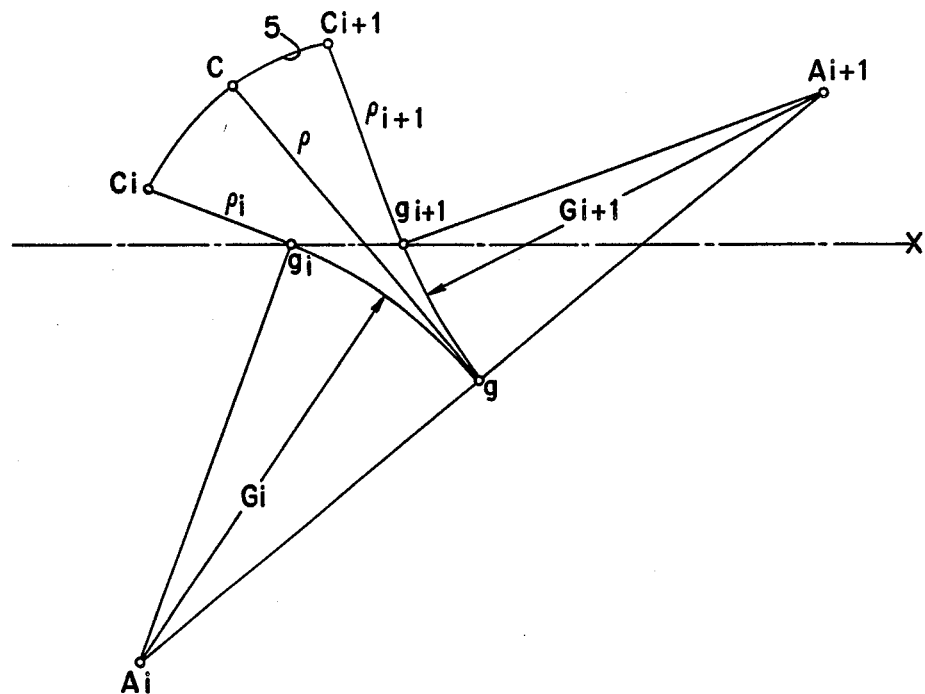
FIG. 4 is a diagram showing a part of the tooth-profile of a basic rack used for making the tooth-profile according to the present invention.

In FIG. 4 the X axis represents a pitch line, and reference numeral 5 denotes a part of the tooth-profile curve of the rack.

A section $C_i$-C of the tooth-profile curve 5 is an involute of a small arc $g_i$-g, the center $A_i$ of curvature of the arc $g_i$-g being at the side of the addendum, and the radius of the base circle of the arc $g_i$-g is $G_i$. A section $C$-$C_{i+1}$ of the tooth-profile curve 5 is an involute of a small segmental curve g-$g_{i+1}$, the center $A_{i+1}$ of curvature of the arc g-$g_{i+1}$ *being at the side of the dedendum, the radius of the base circle of the arc g-$g_{i+1}$* being $G_{i+1}$, and the small arcs $g_i$-g and g-$g_{i+1}$ have a common normal line at point g.

Accordingly, in the section $C_i$-C, $\rho$ gradually increases (that is, $\rho_i < \rho$), and in the section C-$C_{i+1}$, $\rho$ gradually decreases (that is, $\rho < \rho_{i+1}$).

In the same manner as described above, the tooth-profile curve 5 is extended toward the right and left in FIG. 4.

One end point $g_i$ of the arc $g_i$-g and one end point $g_{i+1}$ of the arc $g_{i+1}$-g are on the pitch line X, and the other end points g are at an opposite side of the tooth-profile curve 5 near the pitch line X. The angles that spread from each of the centers $A_i$, $A_{i+1}$ of curvature to each of the arcs $g_i$-g, $g_{i+1}$-g are preferably within 1–5 degrees and more preferably within 2–3 degrees.

If these angles are increased the resulting tooth-profile becomes substantially the involute tooth-profile, in both cases the object of the present invention can not be achieved. In view of the above, it is noted that the gear according to the present invention is positioned midway between the involute gear and Wildhaver-Novikov type gear.

When the said angle is about three degrees, the tooth-profiles as shown in FIGS. 1 and 2 are obtained. Since these tooth-profiles can be designed with a relatively large degree of freedom and without requiring a large pressure angle, and since the radii of curvature along the whole depth are repeatedly increased and decreased, the relative curvature at the point of contact can be reduced.

Figure 5:
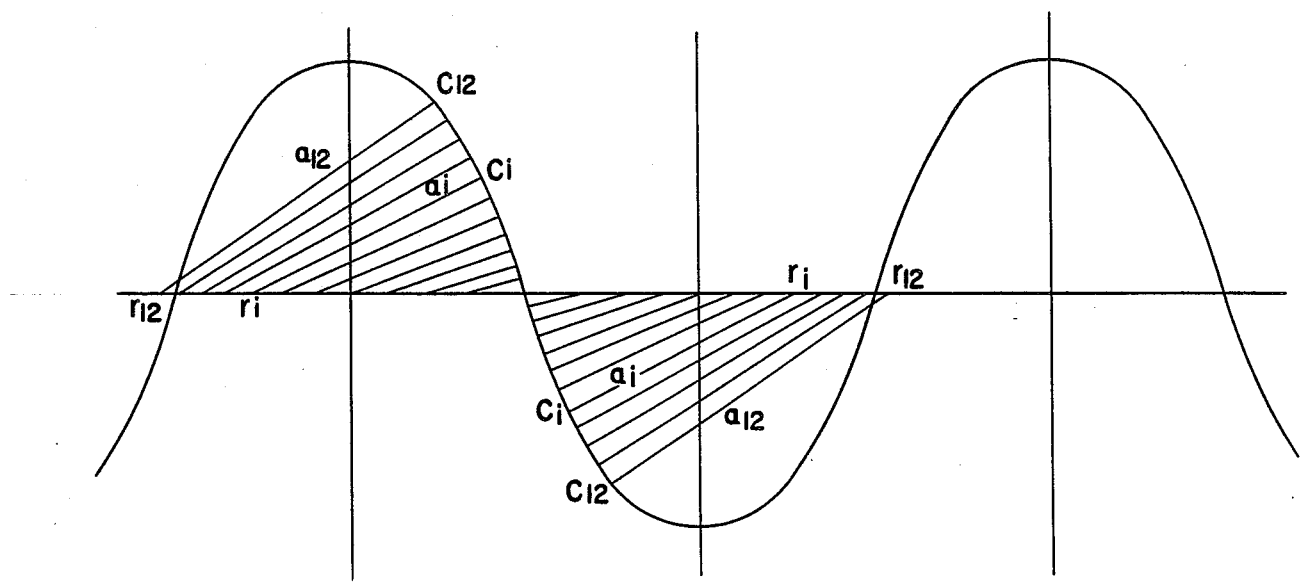
FIG. 5 is a diagram showing the tooth-profile of the basic rack in which twenty-four points having a relative curvature of zero appear during engagement of one gear tooth of the basic rack with the opposite gear tooth.

An example of rack tooth-profiles thus obtained is shown in FIG. 5. In this rack tooth-profile, during one tooth engagement there are twenty four points at which the relative curvature (and also the specific sliding) becomes zero.

Figure 6:
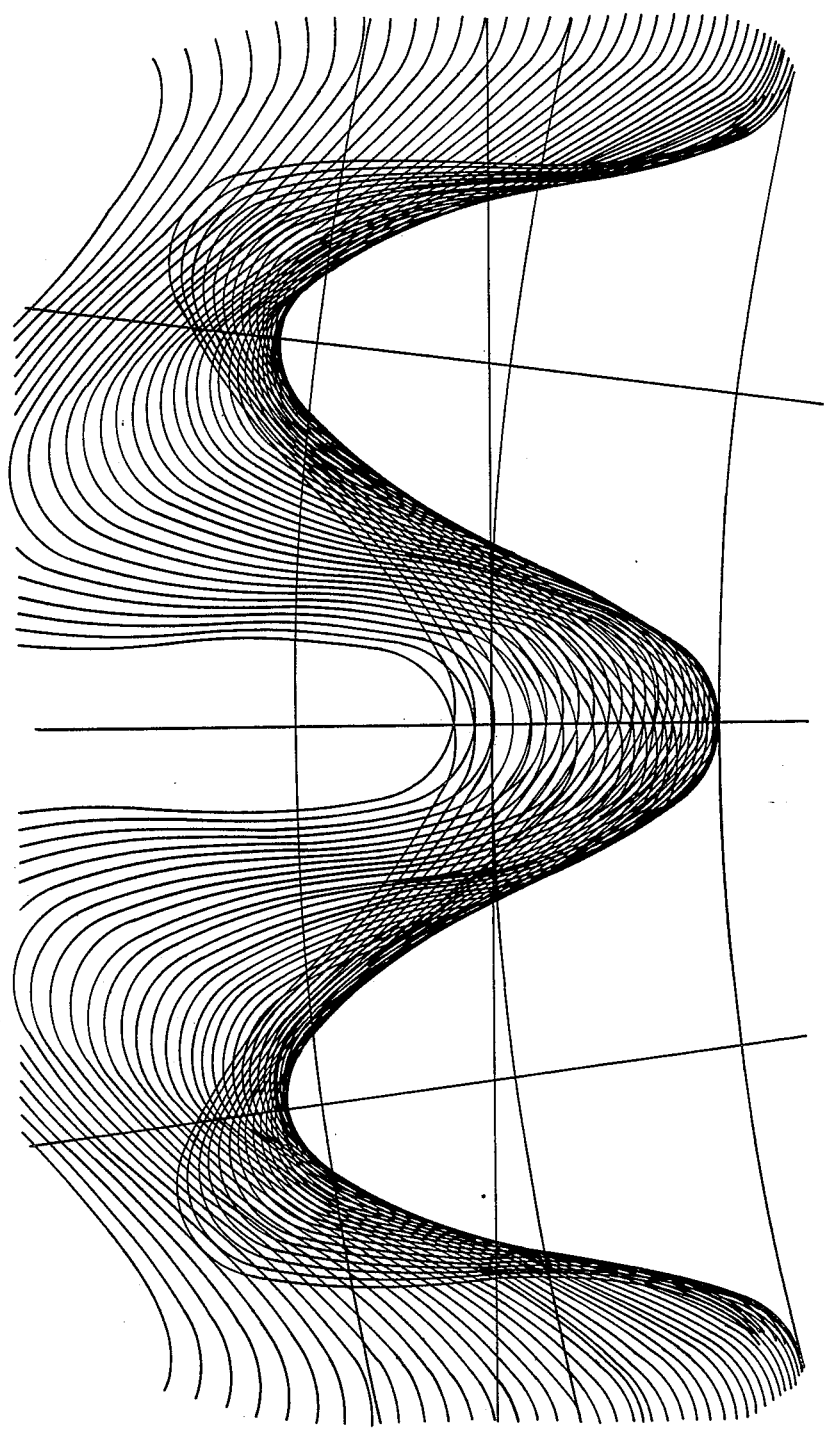
FIG. 6 is a diagram of the tooth-profile according to the present invention which is generated by the basic rack shown in FIG. 5.

FIG. 6 shows the tooth-profile obtained by machining with the rack shown in FIG. 5.

Since the present invention is constructed as described above, it is possible to have a smaller relative of curvature, to have the contact interval more than one without having too large an operating pressure angle, and to prevent the surface pressure and the bearing stress from being increased, and therefore the strength of the tooth-profile can be markedly increased. Therefore the gear according to the present invention is suitable for power-transmitting gears.

The present invention is not limited to the above embodiments. For example, the arc that constructs the tooth-profile curve is not limited to an involute of a circle as described in the example and if desired, other tooth-profile curves may be employed.

In addition, the present invention is applicable also to internal gears, bevel gears etc. as well as external gears.

INDUSTRIAL APPLICABILITY

The gears according to the present invention can be advantageously utilized for power-transmitting gears, because the strength of the tooth-profile is greater than in the prior art.

I claim:

1. A gear having a pitch line and, at least one tooth that has a tooth profile,
    said tooth profile comprising a multiplicity of sections joined together, wherein the length of each section constitutes a relatively small percent of the tooth profile,
    each said section having an outer surface the shape of which is defined as follows:
    each such shape being substantially the same as the shape of the involute of an arc of a base circle having a center, and the centers for the arcs corresponding to every other one of said sections being on one side of said pitch line and the remaining centers being on the other side of said pitch line.

2. A pair of mating gears, each of which is as is defined in claim 1, wherein there is a multiplicity of points along the tooth profiles of each pair of mating teeth where the relative curvature of the mating teeth is substantially zero.

3. A gear as defined in claim 1, in which said sections are arcs having radii of curvature that increase and decrease repeatedly along the tooth profile.

4. A pair of mating gears each of which has a pitch line and a tooth profile,
    each tooth profile comprising a multiplicity of sections each of which has a shape substantially the same as the involute of an imaginary arc of an imaginary base circle, each such base circle having a center, with the centers complementary to alternate sections being on one side of said pitch line and the remaining centers being on the other side of said pitch line.

5. A pair of mating gears as defined in claim 4, wherein each pair of engaging teeth has a multiplicity of areas of engagement wherein the relative curvature between the mating teeth is substantially zero.

6. Gears having a tooth-profile characterized in that that a locus of the center curvature ($g_i g$, $g_{i+1}$) is a series curves ($g_i g$, $gg_{i+1}$) which is formed by alternately connecting a small arc ($g_i g$), having its center on the addendum side of the pitch line and a small arc ($gg_{i+1}$) having its center on the dedendum side of the pitch line so that the arcs have a common normal line ($A_i g A_{i+1}$) at each end (g) thereof and that the tooth-profile curve consists of a curve ($c_i c c_{i+1}$) formed by connecting alternately and smoothly the involutes ($c_i c$, $c_{i+1}$) of said two types of small arcs ($g_i g$, $gg_{i+1}$).

7. A pair of mating gears, each of which is defined in claim 6, wherein there is a multiplicity of points along the tooth profiles of each pair of mating teeth where the relative curvature of the mating teeth is substantially zero.

8. A pair of mating gears, each of which is defined in claim 6, having tooth profiles as shown in FIGS. 1 and 2 of the drawing in this case.

* * * * *